US008867747B2

(12) United States Patent
McGrew et al.

(10) Patent No.: US 8,867,747 B2
(45) Date of Patent: Oct. 21, 2014

(54) KEY GENERATION FOR NETWORKS

(75) Inventors: David A. McGrew, Poolesville, MD (US); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1439 days.

(21) Appl. No.: 12/414,772

(22) Filed: Mar. 31, 2009

(65) Prior Publication Data

US 2010/0246829 A1     Sep. 30, 2010

(51) Int. Cl.
*H04L 9/08*     (2006.01)

(52) U.S. Cl.
CPC .............. *H04L 9/0869* (2013.01); *H04L 9/083* (2013.01)
USPC ....................................... 380/278

(58) Field of Classification Search
USPC ....................................... 380/278
See application file for complete search history.

(56) References Cited

U.S. PATENT DOCUMENTS

| | | | |
|---|---|---|---|
| 7,234,058 B1 | 6/2007 | Baugher et al. | |
| 7,234,063 B1 | 6/2007 | Baugher et al. | |
| 7,350,227 B2 | 3/2008 | McGrew et al. | |
| 7,418,100 B2 | 8/2008 | McGrew et al. | |
| 7,509,491 B1 | 3/2009 | Wainner et al. | |
| 8,015,597 B2 * | 9/2011 | Libin et al. ........................ 726/5 |
| 8,086,850 B2 * | 12/2011 | Ghosh ........................... 713/163 |
| 2006/0184999 A1 | 8/2006 | Guichard et al. | |
| 2007/0209071 A1 | 9/2007 | Weis et al. | |
| 2009/0060200 A1 * | 3/2009 | Sheu et al. .................... 380/278 |
| 2009/0083536 A1 | 3/2009 | Weis et al. | |
| 2009/0167535 A1 * | 7/2009 | Sanchez et al. ............ 340/573.1 |

OTHER PUBLICATIONS

Du. "A Pairwise Key Pre-distribution Scheme for Wireless Sensor Networks" Pub. Date: Oct. 2003, pp. 1-7.*

* cited by examiner

*Primary Examiner* — Krista Zele
*Assistant Examiner* — James Forman
(74) *Attorney, Agent, or Firm* — Tucker Ellis LLP

(57) ABSTRACT

Systems, methods, and other embodiments associated with key generation for networks are described. One example method includes configuring a key server with a pseudo-random function (PRF). The key server may provide keying material to gateways. The method may also include controlling the key server to generate a cryptography data structure (e.g., D-matrix) based, at least in part, on the PRF and a seed value. The method may also include controlling the key server to selectively distribute a portion of the cryptography data structure and/or data derived from the cryptography data structure to a gateway. The gateway may then encrypt communications based, at least in part, on the portion of the cryptography data structure. The method may also include selectively distributing an epoch value to members of the set of gateways that may then decrypt an encrypted communication based, at least in part, on the epoch value.

22 Claims, 7 Drawing Sheets

KEY GENERATION FOR NETWORKS

BACKGROUND

It may be desirable to provide security for communications that traverse networks (e.g., public networks). Security for gateways that communicate with each other using public networks may include encrypting data traffic between gateways to prevent snooping and/or inserting malicious material into the data traffic (e.g., spoofing). Encrypting data may also facilitate verifying the authenticity of a message. Authenticating a message may include verifying that the message was sent by the identified sender. Security between gateways is necessary when utilizing virtual private networks (VPNs) that use mesh networking that traverse public networks.

Traditional encryption embodiments have utilized a single key or single set of keying material for all members (e.g., gateways) of a network. In this simple group-keyed network solution, all gateways install and use the same encryption keys (e.g., keys). One skilled in the art will realize that a key may be used by itself, or with other secret material, to encrypt the message. The simple group-keyed network solution may provide an adequate level of security in a low threat environment because each gateway is trusted to pass the same data to any other gateway. In this configuration, it must be assumed that all gateways are trusted identically. However, a vulnerability may exist. An attacker may simply take over a single gateway and may then eavesdrop on all traffic in the network. Additionally, the attacker may inject packets claiming to be from any of the legitimate gateways.

A single gateway may be compromised, for example, due to poor physical security or poor firewalls. If a single gateway is taken over by an attacker, encryption between all members may be compromised if the network uses the simple group-keyed method where a single key set is distributed to all network members. Thus, simple group-keyed networks do not provide adequate security in a hostile environment.

Pair-wise keying has been implemented in networks in response to the security issues associated with single group-keyed networks. Pair-wise keying may provide a key or pair of keys for each possible connection between gateways. However, when a network includes a large number of nodes/gateways, providing keys for every pair (e.g., pair-wise keying) may become problematic. For a network of one hundred nodes, 100×99 keys are required for pair-wise keying. This requires communicating on the order of 156 kilobytes of memory to handle keys that are 128 bit values. However, as the number of nodes increases, the amount of memory required to store the keys is squared relative to the number of nodes. This is because each possible pairing requires a key. Therefore, it may become impractical, if possible at all, to store all of the keys required for a large mesh network.

A symmetric Key Generation System, or KGS for short, is a system that allows a pair of users to generate a secret pair-wise key using secret data that was issued to the pair of users by a trusted authority. Each user of the KGS receives a different set of data from the authority. The algorithm by which an entity generates a pair-wise key to communicate with another entity takes as an input the secret data of the first user and the identifier of the second user. The identifiers are controlled by the trusted authority. When a user is introduced into the system, that user is issued secret data and a particular identifier by the authority. The KGS itself provides no way to securely communicate the shared secret data between the authority and the users. Instead, there is a secure channel between the authority and the user over which this data is passed.

When two users of the system need to communicate securely, they compute a pair-wise key as follows. The two users employ a process that takes as an input their own secret data and the identity of the other entity with which the pair-wise key is to be shared. The process outputs the pairwise key. This system can be used to generate $n(n-1)/2$ keys that can be used for pairwise communication between n users. A user can generate, on demand, any of the n−1 keys that that user might need. When using a KGS, the storage used by a user to store the secret data issued to them by the authority is much smaller than n−1 keys.

A KGS is called k-secure if the compromise of k or fewer users does not affect the security of the system. The threshold k is a parameter of the system. It is possible to make a KGS in which each user stores O(k) data, where k is independent of the number n of users of the system. R. Blom described a particular KGS in An Optimal Class of Symmetric Key Generation Systems, Advances in Cryptology: Proceedings of Eurocrypto 84, Lecture Notes in Computer Science. Vol 209, Springer-Verlag, Berlin, 1984, pp. 335-338. In general, an abstract KGS can be considered to be a particular set of processes based on a particular set of algorithms. There is an algorithm that the authority uses to initialize the KGS. This is a random process, and the authority maintains the data generated by this process as a secret. This data is called the KGS authority secret data. There is another algorithm by which the authority computes the secret data to be given to the users. This data is called the KGS user secret data. There is yet another algorithm by which a user computes a pairwise key from their secret data and the identifier of the other user.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

BRIEF OVERVIEW

Figure 1:
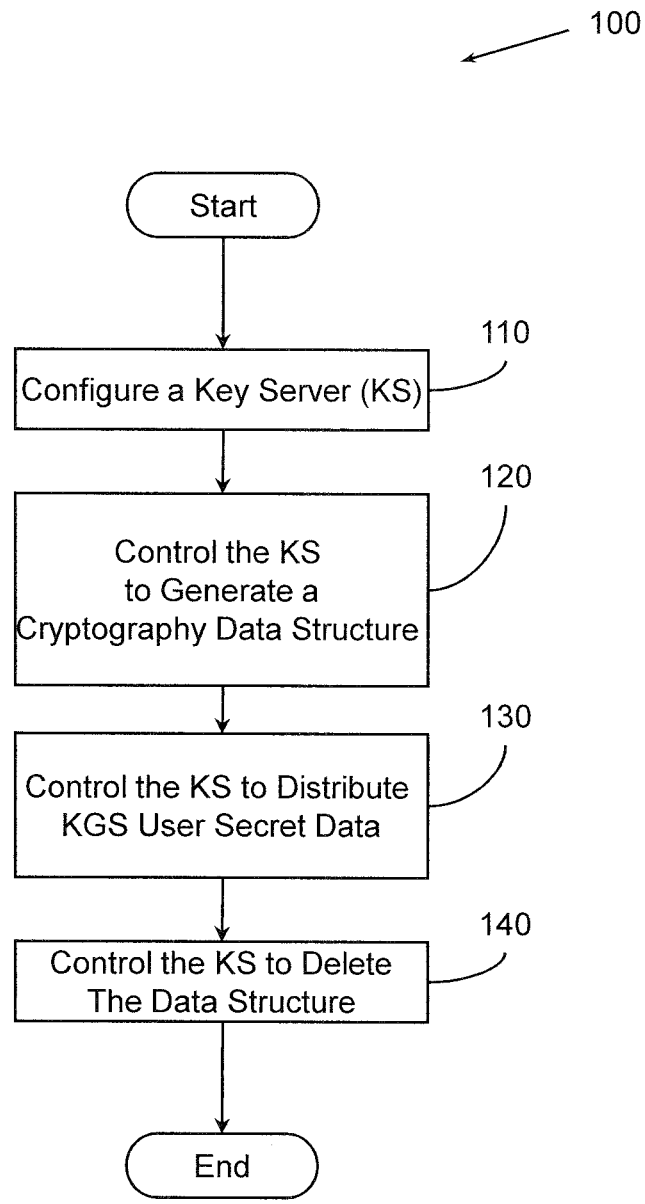
FIG. 1 illustrates an example method associated with key generation for networks.

Security in networks may be enhanced by pairwise keying. Pair wise keys may be individual pairs of keys for each potential pairing of network members. For example, a first member of the network may have a first key that corresponds to a second key held by a second member of the network. No other members of the network will have these keys. The first key and the second key may be used to facilitate encrypted communications between the first member and the second member of the network. As the network becomes larger, storing all of the pair-wise keys for a large number of members (e.g., gateways) may be impractical and may expose the network to unnecessary risks. Thus, example systems and methods may generate, share, and store less than a complete set of secret material to minimize exposure to colluding actors.

The algorithm that the authority uses to generate the KGS authority secret data uses a random process to ensure that that data is unpredictable. However, the KGS authority secret data may take up a large amount of memory, causing the authority to dedicate a large amount of memory to store it. In order to avoid storing all of this data, the KGS authority can replace the random data used as an input to the KGS initialization process with pseudo-random data generated with a pseudo-random function (PRF) from a short, random seed value. By using the PRF in a consistent manner, the KGS authority secret data can be re-generated from the seed value. In the Blom KGS, the KGS authority secret data consists of a two-dimensional array of elements, which we call the D-matrix. Each element of the D-matrix is an element of a finite field, such as $GF(2^{128})$. A PRF may be used to generate a D-matrix. The PRF may also generate portions of a D-matrix (e.g. rows D-matrix) without having to generate and store the entire D-matrix. The D-matrix is used in the Blom KGS to compute the KGS user secret data. While a D-matrix is described, it is to be appreciated that other cryptographic data structures may be employed.

The generation of the D-matrix may retain the scalability of a group VPN with a single set of keys. However, the D-matrix process may also provide true pair-wise keying. Pair-wise keying may prevent an attacker that compromises one of the devices in the mesh network from using the keys gained by the compromise to decrypt the packets of the other gateways in the VPN. Also, the process may prevent a compromised gateway from successfully spoofing one of the communicating gateways. The process may also be resistant to collusion when co-operating attackers overtake several VPN gateways and observe the keys stored in those gateways.

The seed value and/or the PRF may be distributed to additional collaborating key servers, each of which can act in the role of a KGS authority. One skilled in the art will realize that the PRF may be stored in hardware by the collaborating key servers and that only the seed value used by the PRF may be distributed to the collaborating key servers. All of the key servers may collaborate together to distribute portions of the KGS user secret data. Cooperation between the key servers may prevent a gateway from receiving multiple portions of the secret material. Sharing the same portion of secret material may allow one gateway to monitor and/or spoof the communications of another gateway.

Additionally, an epoch value may be distributed to members of a network. Keys may be generated using the epoch value in addition to the KGS secret user data. The epoch value may facilitate revoking group members and ensure that a new group member cannot decrypt communications that occurred before the new group member joined the group.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with key generation for networks. Method 100 may include, at 110, configuring a key server (KS). The KS may be configured at 110 with a pseudo-random function (PRF). The KS may be associated with a set of gateways for which the KS provides keying material. In one embodiment, the set of gateways form one of, a partial mesh network, and a mesh network.

Method 100 may also include, at 120, controlling the KS to generate a KGS authority secret data. The KGS authority secret data may be stored in a cryptographic data structure (CDS). The cryptographic data structure may be, for example, a D-matrix. The D-matrix may be generated at 120 based, at least in part, on the PRF and a seed value. One skilled in the art will realize that in some instances only part of the D-matrix or other cryptographic data structure may be generated. For example, a row of a two dimensional D-matrix may be generated on demand without generating the entire D-matrix. One skilled in the art will also realize that the D-matrix may be a two dimensional matrix but the D-matrix is not limited to two dimensions.

Method 100 may also include, at 130, controlling the KS to distribute KGS user secret data. The KGS user secret data for a particular user may be selectively distributed at 130 to a member of the set of gateways. The member of the set of gateways may encrypt communications based, at least in part, on the KGS user secret data. This data may be a secret material that is used as a key or used to generate a key for encrypting or decrypting messages. This may facilitate secrecy in communications between members of the set of gateways.

In one embodiment, method 100 includes controlling the KS to selectively distribute a second set of KGS user secret data to a second member of the set of gateways. The second member of the set of gateways may encrypt a message based, at least in part, on the second set of KGS user secret data. These keys may be used to encrypt or decrypt messages between the member of the set of gateways and the second member of the set of gateways.

In one embodiment, the KGS user secret data contains secret material to facilitate encrypted communications between the member of the set of gateways and a plurality of other members of the set of gateways. In one embodiment, the KGS user secret data facilitates generating a set of pair wise keys. Pair-wise keys may be keys that allow communications between gateways in the network. For example, a first gateway may have a key that corresponds to a key on a second gateway. These keys may allow the gateways to encrypt or decrypt the communications from the other gateway.

Method 100 may also include, at 140, controlling the KS to delete the KGS authority secret data. One skilled in the art will realize that this may include deleting part of that data. For example, in the Blom KGS, when a row of the D-matrix is generated on demand, that row may then be deleted. Creating and deleting rows of the D-matrix may allow a key generation system to save memory by not having to store an entire D-matrix. Due to the increasing number of nodes and/or gateways on a mesh network it may be impractical to store an entire D-matrix for a large mesh network. Erasing saves memory resources. While erasing a D-matrix is described, more generally method 100 may include deleting all and/or a portion of a cryptographic data structure created earlier.

While FIG. 1 illustrates various actions occurring in serial, it is to be appreciated that various actions illustrated in FIG. 1 could occur substantially in parallel. By way of illustration, a first process could configure a key server (KS) at 110, a second process could control the KS to generate a D-matrix at 120, a third process could control the KS to distribute KGS user secret data at 130, and a fourth process could control the KS to delete the D-matrix at 140. While four processes are described, it is to be appreciated that a greater and/or lesser number of processes could be employed and that lightweight processes, regular processes, threads, and other approaches could be employed.

In one example, executable instructions associated with performing a method may be embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform method 100. While executable instructions associated with the above method are described as being embodied as a logic encoded in one or more tangible media, it is to be appreciated that executable instructions associated with other example methods described herein may also be stored on a tangible media.

A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible media may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Figure 2:
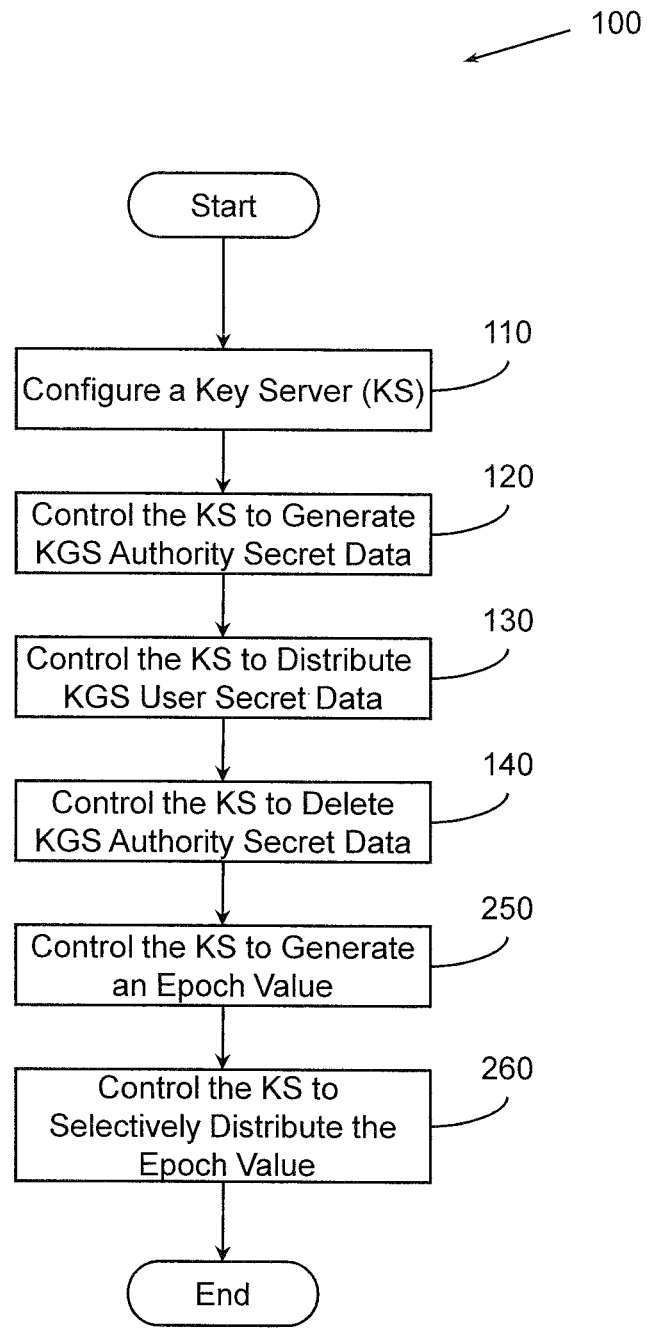
FIG. 2 illustrates another example method associated with key generation for networks.

FIG. 2 illustrates another embodiment of method 100 associated with key generation for networks. Method 100 may also include, at 250, controlling the KS to generate an epoch value. The epoch value may be a nonce provided by the KS. The nonce may be used for a particular time interval.

In one embodiment method 100 may also include, at 260, controlling the KS to selectively distribute the epoch value. The epoch value may be selectively distributed at 260 to a plurality of members of the set of gateways. The plurality of members of the set of gateways may decrypt an encrypted communication based, at least in part, on the epoch value. The epoch value may permute pair-wise keys generated from KGS user secret data distributed to the set of gateways. For example, the epoch value and the keys generated by the KGS may be used as input to a pseudorandom process. The output of those keys may be used in place of the keys generated by the KGS. The keys that are derived in part from the epoch value are unpredictable to an attacker that does not know that value.

In one embodiment, controlling the KS to selectively distribute the epoch value at 260 to a plurality of members of the set of gateways may be for the purpose of encrypting a message. The plurality of members of the set of gateways may encrypt a message based, at least in part, on the epoch value. The epoch value may permute pair-wise keys generated from KGS user secret data distributed to the set of gateways.

In one embodiment, method 100 may also include distributing a new epoch value to a selected group of the set of gateways. The selected group of the set of gateways may communicate using encryption among the selected group. The encryption may be based, at least in part, on the new epoch value. This may facilitate forward security and/or revocation of a gateway. Revocation may be accomplished by issuing a new epoch value to all members of the gateway except for the revoked member. The included members of the gateway (e.g., receivers of the new epoch value) will continue to communicate using the new epoch value. However, the revoked member will not be able to communicate with the included members. This is because encryption is based, at least in part, on the new epoch value. The included members of the gateway may also continue to use the KGS user secret data that is possessed by the revoked member without the revoked member being able to read the communication. Again, this is because the encryption is based, at least in part, on the new epoch value.

Epoch values may also be used to maintain forward security. Forward security may ensure that newly added members are not able to learn previous group keys and/or collude to break previous group keys. The security against past users of a key, in whatever context, is a valuable property when group membership (e.g., gateway numbers) grows over time. When new members are added, a new epoch value may be issued to all members of the mesh network. This may prevent new members from colluding to break encryption codes used by past members.

Forward security and revocation capability may be provided by permuting the pair-wise keys created with the KGS user secret data with the epoch value. For example, the pair-wise key used to encrypt communication could be computed by applying a cryptographic function to both the pair-wise key generated by the KGS and the epoch value. A pseudorandom function can be used to ensure that the pair-wise key used to encrypt communication is not predictable by an adversary that does not know the epoch value. The epoch value may be a nonce that describes a key used for a particular period of time. Epoch values may be periodically provided and updated. In an emergency, epoch values may be provided to gateways when a member of the set of gateways needs to be revoked immediately.

Figure 3:
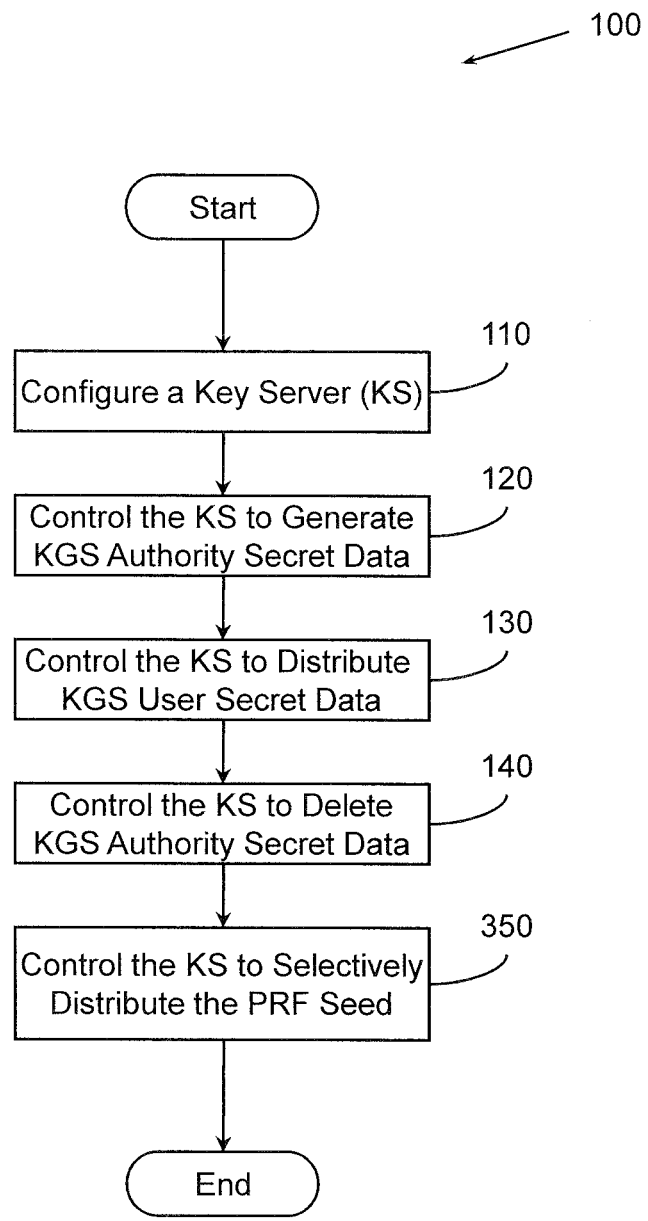
FIG. 3 illustrates another example method associated with key generation for networks.

FIG. 3 illustrates another embodiment of method 100. This embodiment of method 100 includes, at 350, controlling the KS to selectively distribute the seed value used by the PRF. The seed value may be selectively distributed at 350 to a second KS. Distribution of the KGS user secret data, based on the PRF and the seed value, may be cooperatively performed by the KS and the second KS. The second KS may cooperatively provide keys with the KS to the gateways. For example, the KS and the second KS may cooperate to insure that a particular set of KGS user secret data is given to a single gateway. This prevents a single gateway from getting too much secret material. One skilled in the art will realize that the second KS may also act as a backup key source and/or may act as a primary on a part of the network.

Figure 4:
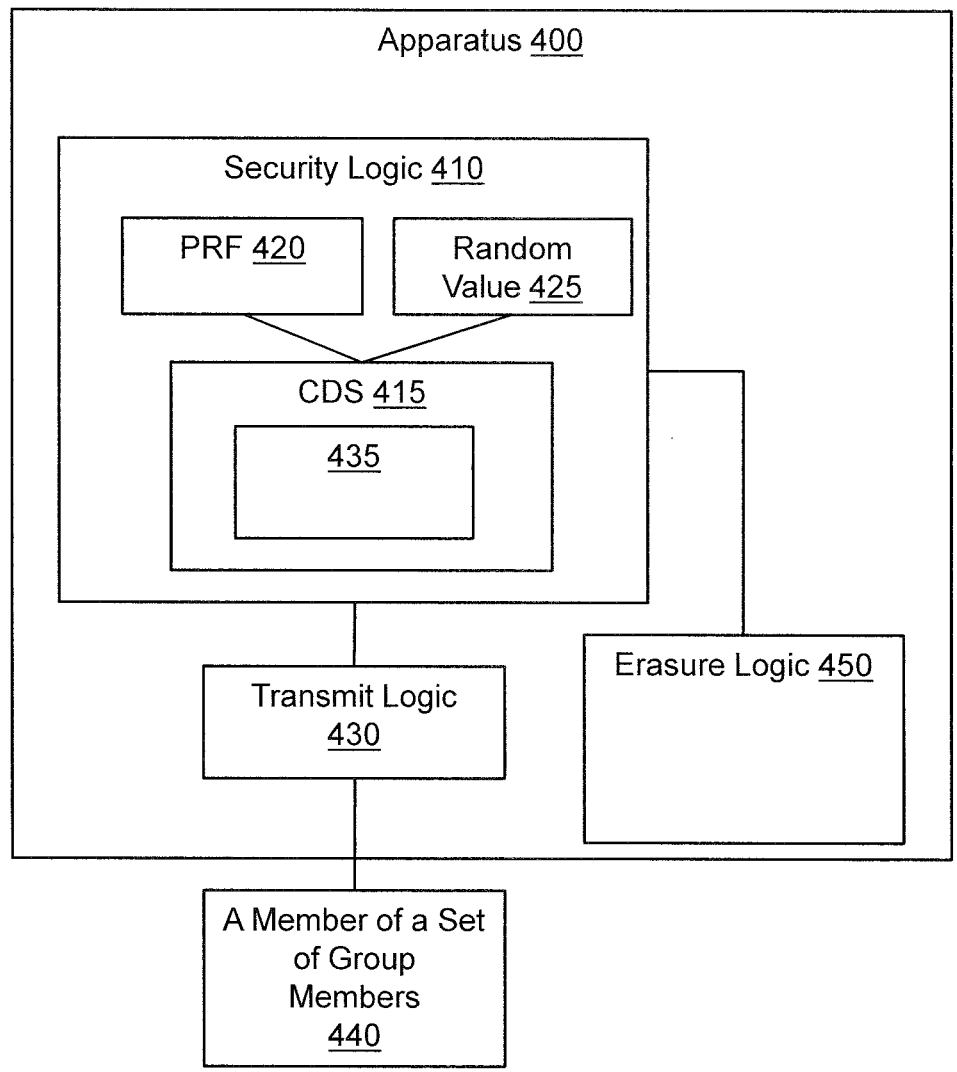
FIG. 4 illustrates an example apparatus associated with key generation for networks.

FIG. 4 illustrates an apparatus 400 associated with key generation for networks. Apparatus 400 may be similar to a key server that distributes keying material to members of a network (e.g., group members, gateways). Apparatus 400 includes a security logic 410 to create a cryptography data structure (CDS) 415 based, at least in part, on a pseudo-random function (PRF) 420 and a random value 425. The random value 425 may be similar to the seed value used to generate the D-matrix at 120 in FIG. 1. One skilled in the art will realize that the CDS 415 may be a D-matrix, matrix, multidimensional data structure, or any other type of KGS authority secret data. The random value and the seed value may be a pseudo random number created by a mathematical function.

"Logic", as used herein with respect to FIGS. 4-7, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

In one embodiment, the security logic 410 is to create a single portion of the CDS 415. The security logic 410 may delete the single portion of the CDS 415. However, an erasure logic 450 may also delete the single portion of the CDS 415. One skilled in the art will realize that the PRF 420 and the random number 425 may be used to create a portion of the CDS 435, including the single portion of the CDS.

Apparatus 400 may also include a transmit logic 430 to selectively transmit KGS user secret data 435 to a member of a set of group members 440 in a network. The group member may selectively encrypt and decrypt messages based, at least in part, on the KGS user secret data 435. Each group member will receive different KGS user secret data. The KGS user secret data held by a member will allow that member to decrypt the data traffic of the other members. In one embodiment, the portion of the CDS 435 facilitates generation of a set of pair wise keys.

In one embodiment, the transmit logic 430 is to provide the random value 425 to a cryptographic key server (CKS). The CKS may use the random value 425 to construct its own copy of the CDS 415. The CKS may selectively transmit a KGS user secret data 435 to a second group member. The apparatus 400 and the CKS may cooperatively distribute KGS user secret data. Cooperative distribution may include insuring that each KGS user secret data 435 is distributed to only one member of the set of GMS.

Apparatus 400 may also include an erasure logic 450 to erase the CDS 415. One skilled in the art will realize that erasure of the CDS 415 may be erasure of the portion of the CDS 435 instead of the entire CDS 415. Creating and deleting rows of the CDS 435 may allow a key generation system to save memory by not having to store an entire CDS 435. Due to the increasing number of nodes and/or gateways on a mesh network it may be impractical to store an entire CDS 435 for a large mesh network. Consider, for example, a 1000×1000 array of 128 bit values.

In one embodiment, the apparatus 400 includes an epoch transmit logic to transmit an epoch value to a plurality of members of the set of GMs. In one embodiment, the plurality of members of the set of GMs decrypt messages between members of the set of GMs based, at least in part, on the epoch value. In one embodiment, a member of the set of GMs encrypts a message based, at least in part, on the epoch value.

Figure 5:
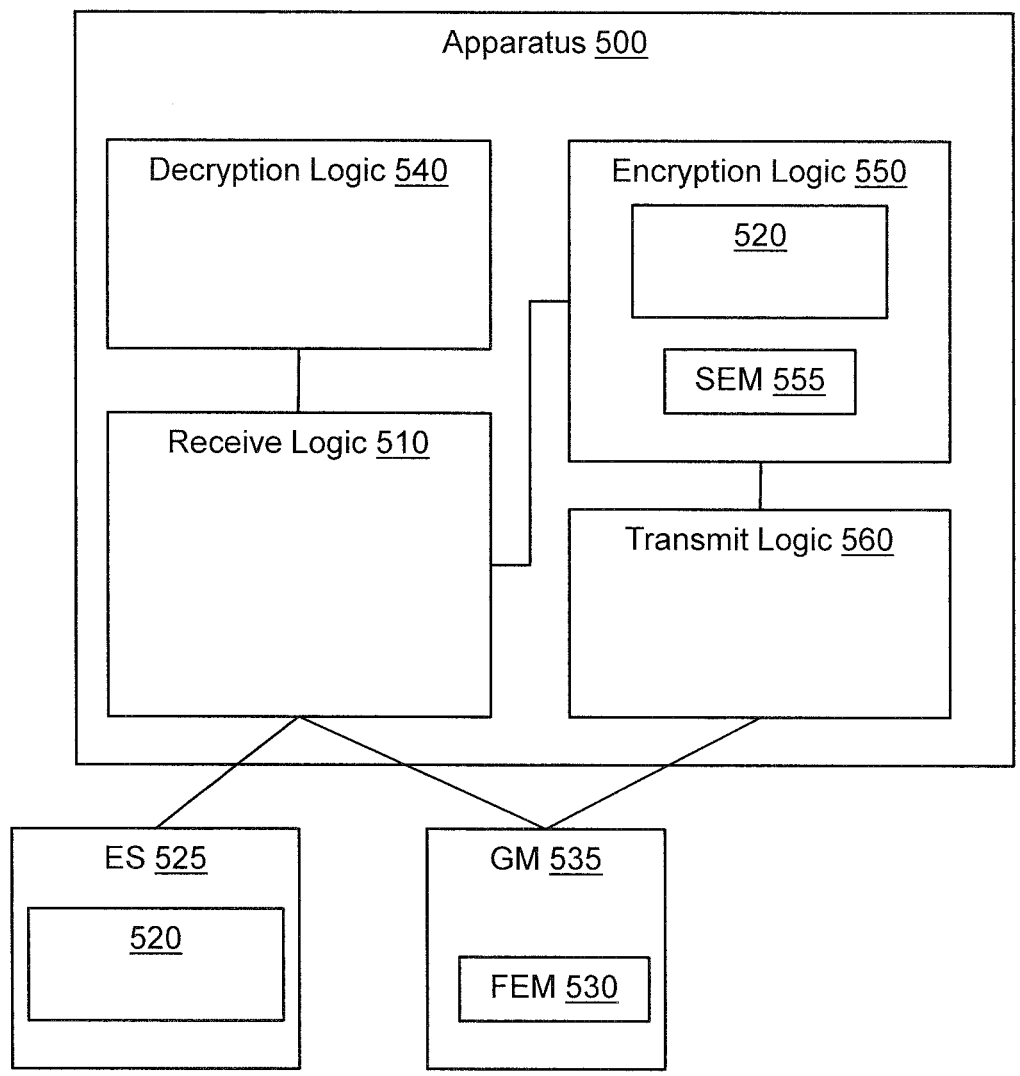
FIG. 5 illustrates another example apparatus associated with key generation for networks.

FIG. 5 illustrates an apparatus 500 associated with key generation for networks. Apparatus 500 may be similar to a member of a network (e.g., group member, gateway) that receives keying material from a key server. The key server may be, for example, the apparatus 400 of FIG. 4. The apparatus 500 may utilize the keying material to encrypt messages with other apparatuses similar to apparatus 500, group members, gateways, and so on.

Apparatus 500 includes a receive logic 510 to receive KGS user secret data 520 from an encryption server 525. The encryption server 525 may be similar to apparatus 400 of FIG. 4. The receive logic 510 may also receive a first encrypted message 530 from a group member 535.

In one embodiment, the receive logic 510 is to receive an epoch value from the ES 525. The epoch value may be shared with a plurality of group members. Encryption and decryption of messages transmitted in the network may be based, at least in part, on the epoch value. The epoch value may facilitate revocation of group members. The epoch may also enhance forward security by preventing newly added group members from decrypting data communications that occurred before the newly added group members were added. Revocation and forward security may be facilitated by providing a new epoch value to group members when new members are added or revoked. In the case of a revocation, the revoked members would not receive the new epoch value that is to be used by the non-revoked members.

Apparatus 500 may include a decryption logic 540 to decrypt the first encrypted message 530 based, at least in part, on the KGS user secret data 520. The group member 535 may have encrypted the first encrypted message 530 based, at least in part, on its own KGS user secret data.

Apparatus 500 may include an encryption logic 550 to encrypt a second encrypted message 555 based, at least in part, on the KGS user secret data 520. The KGS user secret data 520 may be sent to the encryption logic 550 by the receive logic 510. Apparatus 500 may also include a transmit logic 560 to transmit the second encrypted message 555 to the group member 535. The group member 535 may decrypt the second encrypted message 555 based, at least in part, on the KGS user secret data.

Figure 6:
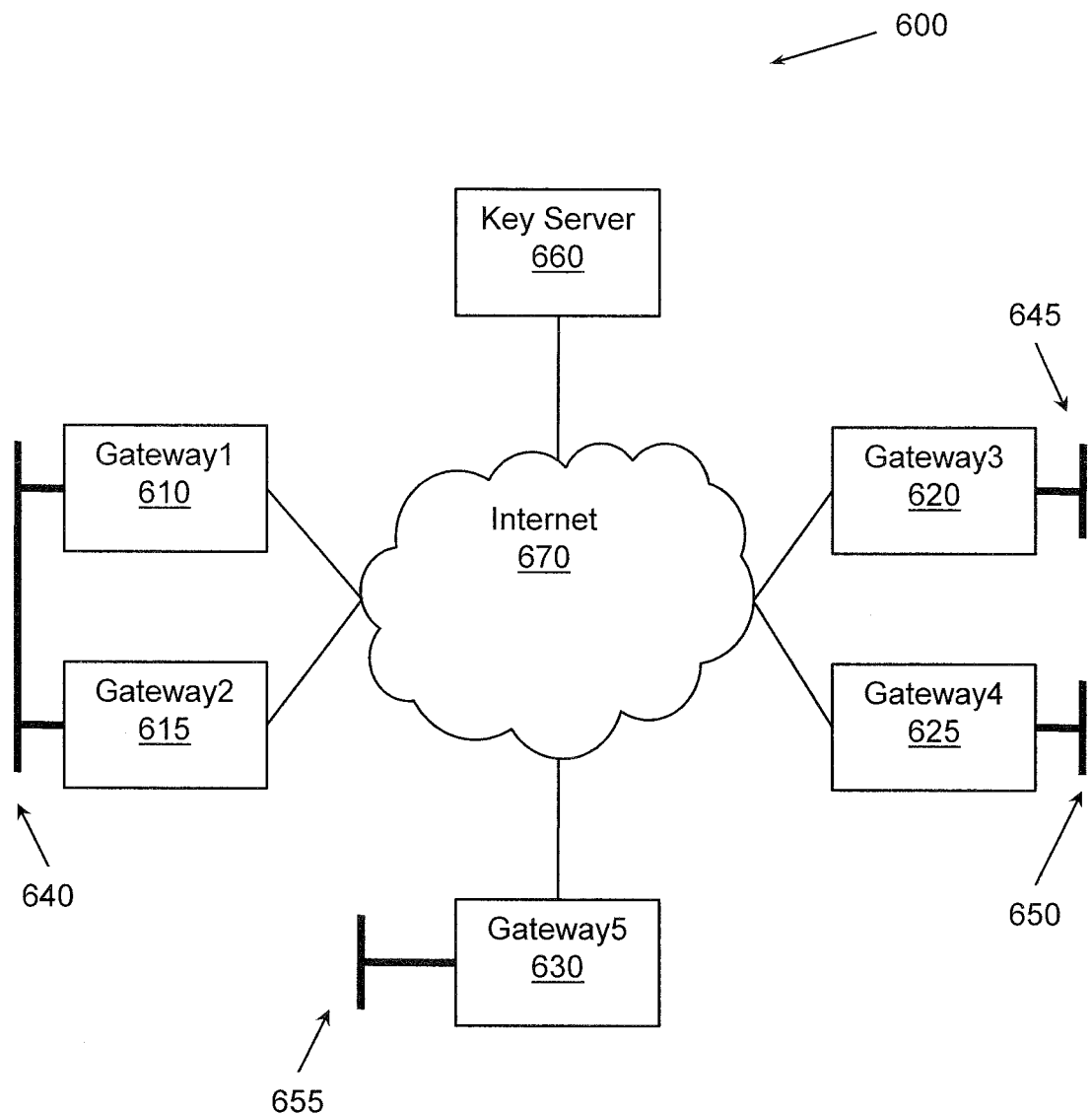
FIG. 6 illustrates an example environment associated with key generation for networks.

FIG. 6 illustrates an example environment 600 associated with key generation for networks. Environment 600 may describe how a dynamic key generation system (DKGS) is applied to a network using a generic routing encapsulation (GRE) tunnel.

FIG. 6 shows a small network with five virtual private network (VPN) gateways, gateway1 610, gateway2 615, gateway3 620, gateway4 625, and gateway5 630. A gateway may be configured with a set of GRE tunnels to another gateway (s). For redundancy, both gateway1 610 and gateway2 615 provide wide area network (WAN) service to a network A 640. Other networks may be serviced by VPN gateways. For example, gateway3 620 may service network B 645, gateway4 625 may service network C 650, and gateway5 630 may service network D 655. Network gateway1 610 and gateway2 615 may not need to communicate directly with each other via the GRE tunnel because they may communicate via the network A 640. Thus, these two gateways may not have a GRE tunnel between them. The group VPN (e.g., group of five gateways) may also include a key server 660. The group VPN may be interconnected partially or fully by the Internet 670. In another embodiment, multiple key servers, including key server 660, may cooperatively distribute keying material to the five gateways.

The following actions describe the key server 660 initialization process for the network of gateways (e.g., VPN network including gateways). The key server 660 may determine the number of colluding VPN gateways that the keying system should be resistant against. In environment 600, two gateways 610 and 615 act as gateways to network A 640. Therefore, these two gateways may share keying material because once one gateway is compromised the network becomes vulnerable even if a different key is provided to the non-compromised gateway. Therefore, four different networks are being protected, network A 640, network B 645, network C 650, and network D 655. The key server 660 may determine that the keying system should be resistant against three colluding gateways because there are four networks being protected. There would not be a need to prevent four colluders, because four colluders would result in every network already being compromised. Using this parameter of three, the key server 660 may generate a 3 ×3 D-matrix filled with random values that may be used as keys or to generate keys for gateway to gateway communication.

Individual gateways may contact the key server 660 using a registration protocol. After authentication and authorization of the individual gateway, the key server 660 may assign the gateway KGS user secret data to use as keying material and/or to create keying material. Gateway1 610 and gateway2 615 may share KGS user secret data because they protect the same network A 640.

VPN operations may begin, for example, when one of the VPN gateways needs to send a packet through a tunnel (e.g. a dynamic routing packet) to another gateway that protects a different network. The gateway sending the message computes the appropriate pair-wise key by using its KGS user secret data and the identifier of the other gateway. The receiving gateway may use its KGS secret data and the identifier of the sending gateway to decrypt the received message.

Figure 7:
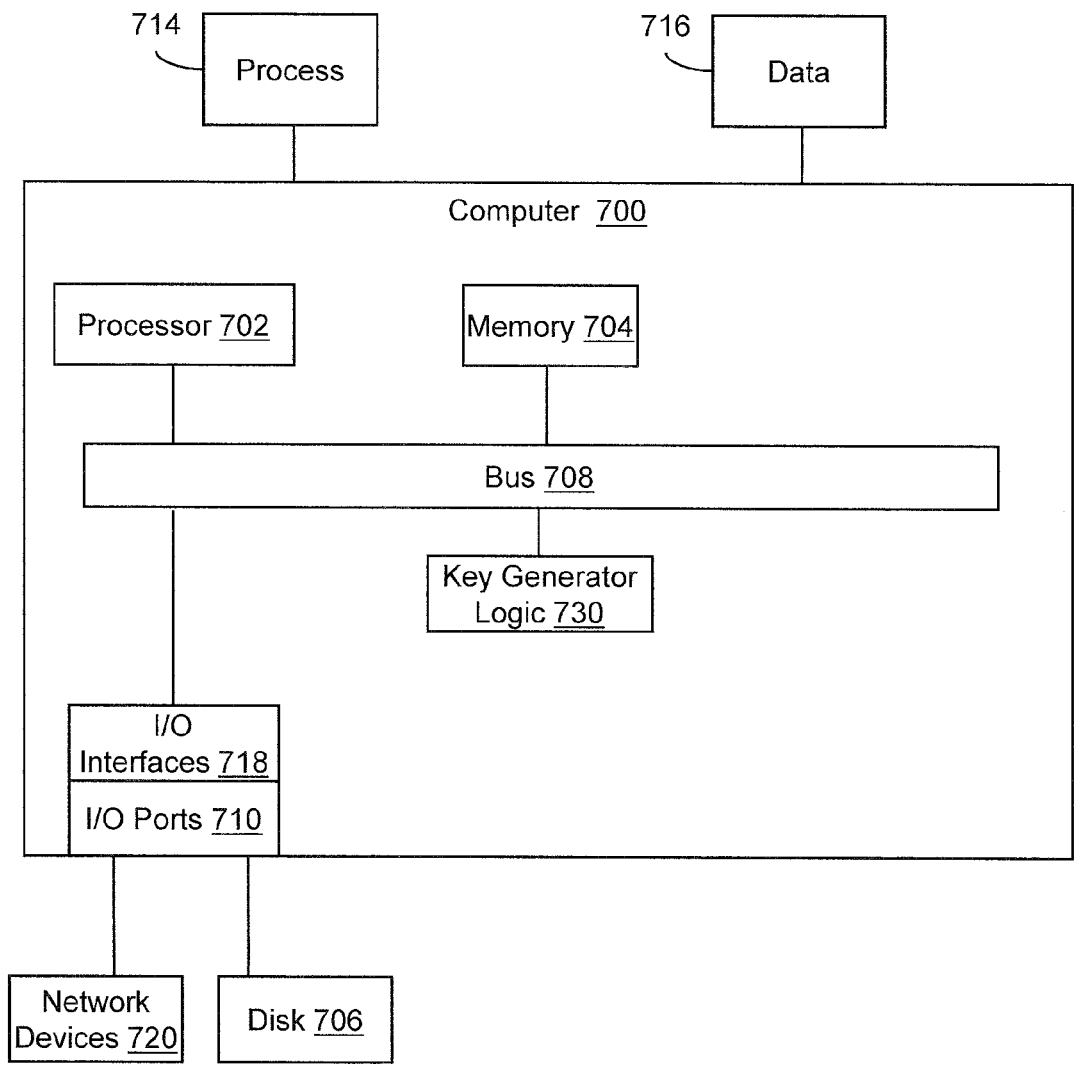
FIG. 7 illustrates an example computing environment in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a key generator logic 730 configured to facilitate key generation for networks. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

Logic 730 may provide means (e.g., hardware, software, firmware) for configuring a key server (KS) with a pseudo-random function (PRF), the KS being associated with a set of gateways in a network for which the KS provides keying material. The means may be implemented, for example, as an ASIC programmed to facilitate key generation for networks. The means may also be implemented as computer executable instructions that are presented to computer 700 as data 716 that are temporarily stored in memory 704 and then executed by processor 702.

Logic 730 may also provide means (e.g., hardware, software, firmware) for controlling the KS to generate a cryptography data structure (CDS) based, at least in part, on the PRF and a seed value. Logic 730 may also provide means (e.g., hardware, software, firmware) for selectively transmitting KGS user secret data derived from the CDS to a member of the set of gateways. The member may selectively encrypt and decrypt messages based, at least in part, on the KGS user secret data. Logic 730 may also provide means (e.g., hardware, software, firmware) for controlling the KS to delete the CDS.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, programmable ROM (PROM), and so on. Volatile memory may include, for example, RAM, static RAM (SRAM), dynamic RAM (DRAM), and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD recordable (CD-R) drive, a CD rewriteable (CD-RW) drive, a digital versatile disk and/or digital video disk read only memory (DVD ROM), and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., peripheral component interconnect express (PCIE), 1394, universal serial bus (USB), Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method comprising:
configuring a key server (KS) with a pseudo-random function (PRF), the KS being associated with a set of gateways for which the KS provides keying material;
controlling the KS to generate a cryptographic data structure for a symmetrical key generation system (KGS) based, at least in part, on the PRY and a seed value;
controlling the KS to generate an epoch value;
controlling the KS to selectively distribute the epoch value and KGS user secret data derived from the cryptographic data structure to a member of the set of gateways;
wherein the KGS user secret data and the epoch value are for generating keys for encrypted communications;
wherein a different set of KGS user secret data is provided to different members of the set of gateways;
revoking at least one member of the set of gateways;
generating a new epoch value; and
distributing the new epoch value to a selected group of the set of gateways that does not include the revoked member, where the selected group of the set of gateways communicate using encryption among the selected group, and where encryption is based on keys generated, at least in part, on the KGS user secret data and the new epoch value.

2. The method of claim 1, further comprising:
controlling the KS to selectively distribute the seed value used in the PRF to a second KS, where distribution of KGS user secret data is cooperatively performed by the KS and the second KS.

3. The method of claim 1,
wherein the epoch value is a nonce provided by the KS, and where the nonce is used for a particular time interval.

4. The method of claim 1, where the set of gateways form one of a partial mesh network or a full mesh network.

5. The method of claim 1, where the KGS user secret data contains a secret material to facilitate encrypted communications between the member of the set of gateways and a plurality of other members of the set of gateways by facilitating generation of a set of pair wise keys.

6. The method of claim 1, where the cryptographic data structure is a D-matrix.

7. The method of claim 1, where the cryptographic data structure stores KGS authority secret data.

8. The method of claim 1, the method comprising controlling the KS to delete the cryptographic data structure.

9. An apparatus, comprising:
a security logic stored in a non-transient memory and executable by an associated processor to create a cryptography data structure based, at least in part, on a pseudo-random function (PRF) and a random seed value and to create a KGS user secret data based on the cryptography data structure
the security logic generating an epoch value; and
a transmit logic stored in a non-transient memory and executable by an associated processor to selectively transmit the KGS user secret data and the epoch value to a member of a set of group members (GMs) in a network, where the member of the set of GMs selectively encrypts and decrypts messages based, at least in part, on the KGS user secret data and the epoch value;
wherein the GMs encrypt communications based on keys generated, at least in part, on the KGS user secret data and the epoch value;
wherein a different set of KGS user data is provided to each member of the set of GMs;

the security logic revoking at least one member of the set of group members;

the security logic generating a new epoch value; and the transmit logic distributing the new epoch value to a selected group of the set of group members that does not include the revoked member, where the selected group of the set of group members communicate using encryption among the selected group, and where encryption is based on keys generated, at least in part, on the KGS user secret data and the new epoch value.

10. The apparatus of claim 9, where the transmit logic is to transmit the random value to a cryptography key server, where the cryptography key server is to selectively transmit a second KGS user secret data to a second member of the set of GMs, and where the apparatus and the cryptography key server cooperatively distribute portions of the KGS user secret data.

11. The apparatus of claim 9, where the security logic is to create a single portion of the cryptography data structure, and where the security logic is to delete the single portion of the cryptography data structure.

12. The apparatus of claim 9, where the network is one of, a partial mesh network, and a full mesh network.

13. The apparatus of claim 9, where the KGS user secret data facilitates generation of a set of pair wise keys.

14. A system, comprising:

circuitry for configuring a key server (KS) with a pseudo-random function (PRF), the KS being associated with a set of gateways in a network for which the KS provides keying material;

circuitry for controlling the KS to generate a cryptography data structure (CDS) for a symmetrical key generation system (KGS) based, at least in part, on the PRF and a seed value;

circuitry for the controlling the KS to generate an epoch value;

circuitry for selectively transmitting KGS user secret data based on a portion of the CDS to a member of the set of gateways and the epoch value, where the member of the set of gateways is to selectively encrypt and decrypt messages based, at least in part, on the KGS user secret data and the epoch value;

circuitry for controlling the KS to delete the CDS; and circuitry for controlling the KS to regenerate at least a portion of the CDS using the PRF and the seed value;

wherein a different set of KGS user secret data is provided to different members of the set of gateways.

15. Logic encoded in one or more non-transitory computer readable medium for execution and when executed operable to perform a method, the method comprising:

configuring a key server (KS) with a pseudo-random function (PRF), the KS being associated with a set of gateways for which the KS provides keying material;

controlling the KS to generate a cryptographic data structure for a symmetrical key generation system (KGS) based, at least in part, on the PRF and a seed value;

controlling the KS to generate an epoch value;

controlling the KS to selectively distribute the epoch value and KGS user secret data derived from the cryptographic data structure to a member of the set of gateways;

wherein the KGS user secret data and the epoch value are for generating keys for encrypted communications;

wherein a different set of KGS user secret data is provided to different members of the set of gateways;

controlling the KS to delete the cryptographic data structure; and regenerating at least a portion of the cryptographic data structure using the PRF and the seed value.

16. The logic of claim 15, the method comprising:

controlling the KS to selectively distribute the seed value used in the PRF to a second KS, where distribution of KGS user secret data is cooperatively performed by the KS and the second KS.

17. The logic of claim 15, the method comprising:

wherein the epoch value is a nonce provided by the KS, and where the nonce is used for a particular time interval.

18. The logic of claim 15, the method comprising:

revoking at least one member of the set of gateways;

generating a new epoch value; and distributing the new epoch value to a selected group of the set of gateways that does not include the revoked member, where the selected group of the set of gateways communicate using encryption among the selected group, and where encryption is based on keys generated, at least in part, on the KGS user secret data and the new epoch value.

19. The logic of claim 15, where the set of gateways form one of a partial mesh network and a full mesh network.

20. The logic of claim 15, where the KGS user secret data contains a secret material to facilitate encrypted communications between the member of the set of gateways and a plurality of other members of the set of gateways by facilitating generation of a set of pair wise keys.

21. The logic of claim 15, where the cryptographic data structure is a D-matrix.

22. The logic of claim 15, where the cryptographic data structure stores KGS authority secret data.

* * * * *